March 3, 1931. R. H. HUTCHINSON 1,794,900
TIRE INFLATING MECHANISM
Filed May 18, 1929  2 Sheets-Sheet 1
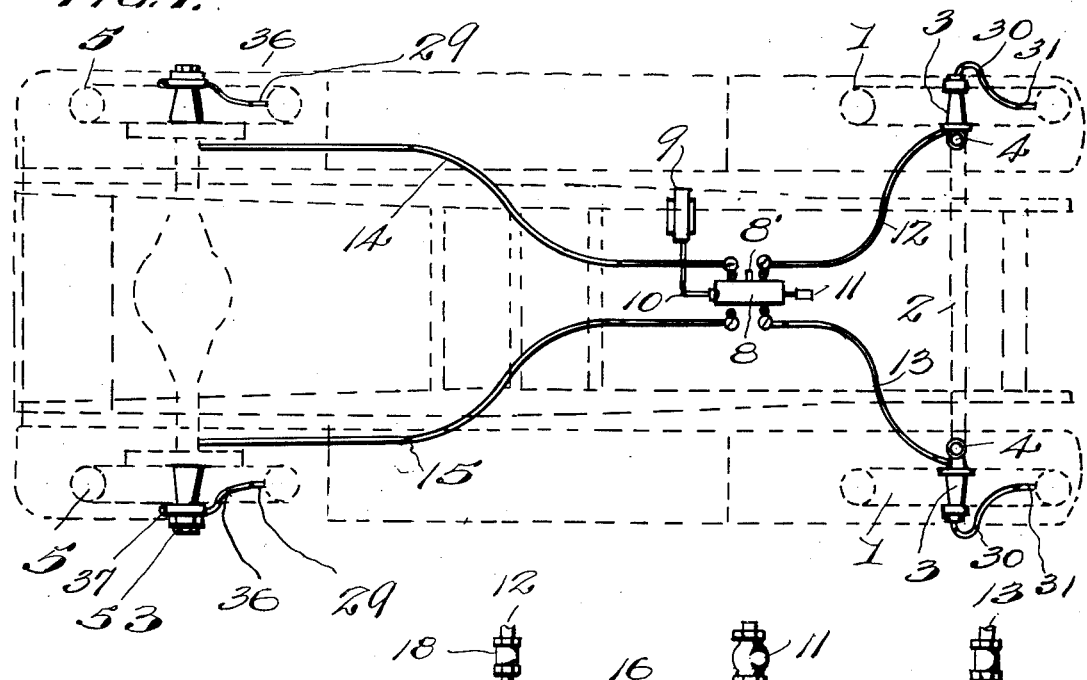

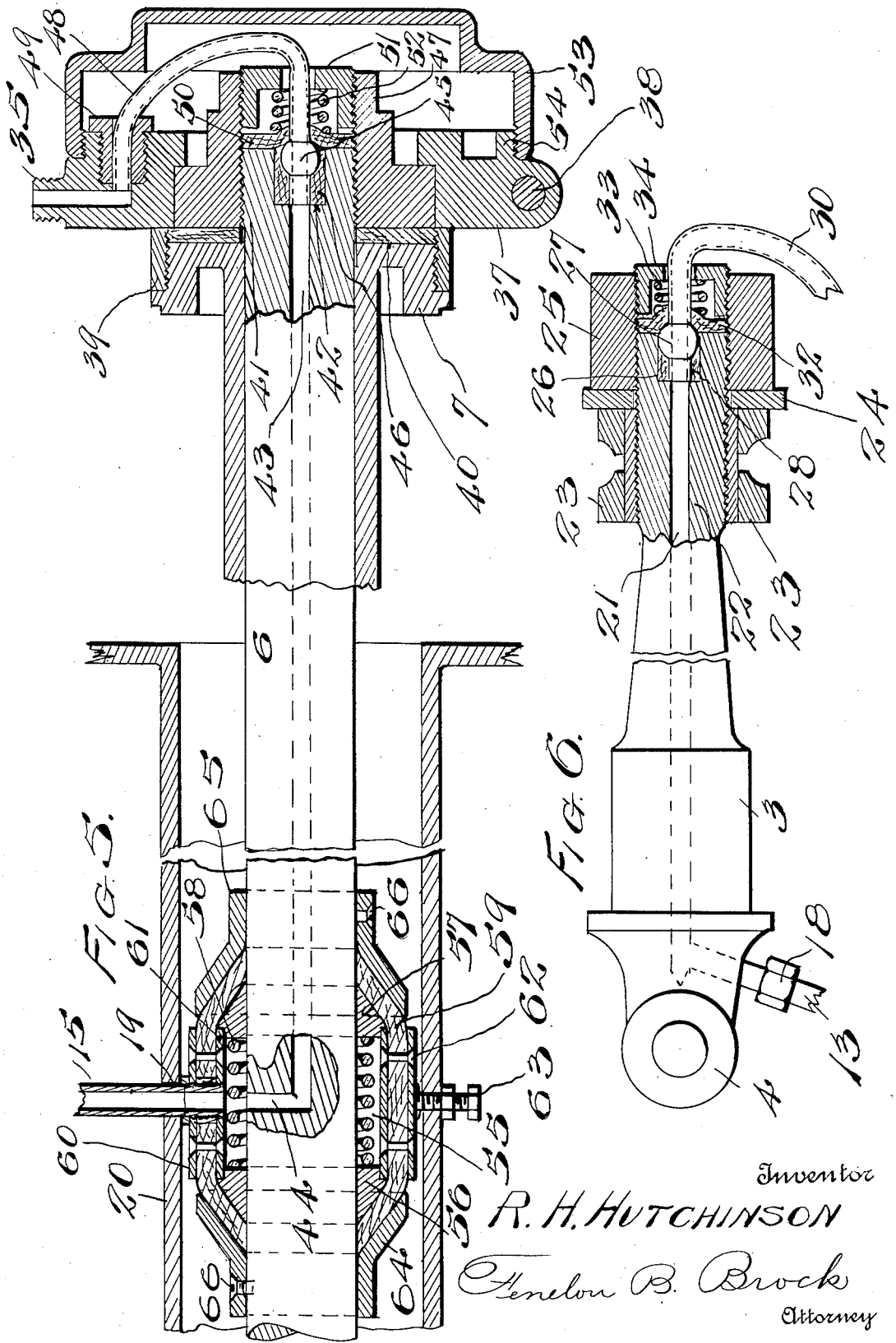

Patented Mar. 3, 1931

1,794,900

UNITED STATES PATENT OFFICE

RUTHERFORD H. HUTCHINSON, OF OGDEN, UTAH

TIRE-INFLATING MECHANISM

Application filed May 18, 1929. Serial No. 364,295.

My invention relates to improvements in tire inflating mechanism for use on automotive vehicles and is designed for the purpose of maintaining the desired air pressure in the pneumatic tires, and for indicating the pressure in the tires, either standard or of the balloon type, in order that the proper or desired pressure may be maintained.

In carrying out my invention, I utilize certain novel combinations and arrangements of parts involving the journal bearings for the front and rear wheels as will hereinafter be more specifically set forth and claimed.

The invention contemplates the use of an air reservoir from which four air pipes are extended to the respective wheels, and each air pipe is provided with a gauge to indicate the pressure in the pneumatic tire with which it is used. A special auxiliary pump may be used on the automotive vehicle for supplying compressed air to the reservoir, or the latter may be supplied with air from an air pump at a gasoline station.

In the accompanying drawings, I have illustrated one complete example of the physical embodiment of my invention, wherein the parts are combined and arranged according to the best mode I have so far devised for the practical application of the principles of my invention.

Figure 1 is a plan view showing the arrangement of the air pipe connections with parts of an automotive vehicle shown in dotted lines;

Fig. 2 is an enlarged view showing the air pressure gauges for the four wheels together with the air reservoir;

Fig. 3 is a view in side elevation at the front of an automobile showing one of the front wheels equipped according to my invention;

Fig. 4 is a view at the rear of the automobile showing one of the rear wheels and its equipment;

Fig. 5 is an enlarged detail view in section showing the arrangement of the journal parts of one of the rear wheels; and Fig. 6 is a detail view partly in section showing the arrangement of parts at the journal of one of the front wheels.

In order that the general arrangement and relation of parts may be readily understood, I have shown in the plan view, Fig. 1, the two front wheels designated by the numeral 1, the front axle 2 and the journal ends 3 pivoted at 4 at the respective ends of the front axle. The rear wheels are designated 5 and their journal ends are indicated as 6, the usual hub structure 7 being shown to indicate the relation of parts.

Beneath the instrument board of the automobile, I provide an air reservoir 8 of suitable size and shape which is provided with a nipple 8' for attachment of an air hose by means of which air may be supplied to the reservoir from an air pump at a gas station or similar place. Preferably, however, the air reservoir 8 is supplied with air under pressure from a pump 9 located at a suitable place on the frame of the automobile and driven with auxiliary power in suitable manner. The air is supplied to the reservoir from the pump through pipe 10, and the reservoir is provided with a safety valve 11 to release excess pressure.

Each of the four wheels of the vehicle is provided with an air pipe, 12 and 13 designating the front wheel pipes and 14 and 15 designating the two rear wheel pipes. These pipes extend from the reservoir and are conveniently located in position to approach the respective wheels, and preferably the pipes are in the form of flexible tubes in order that compensation may be made for vibrations of the automobile.

Each of the pipes is supplied with a cut-out valve 16 and a pressure gauge 17, the valve being located between the reservoir and the gauge in order that the pressure of air in the tires may be controlled by these valves. Throughout the piping arrangement, I utilize unions or couplings 18 in order to secure air tight joints, and at 19 the rear air pipes 14 and 15 are passed through openings 19 in the housing 20 of the rear axle.

The journal 3 of each of the front axles is provided with a longitudinally extending bore or air conduit 21 and a threaded end 22, and the usual bearings 23 and washer 24 together with nut 25 are shown in Fig. 6. The end of the journal 3 is provided with a central recess 26, and in this recess is located a spherical head 27 which rotates with the wheel. A suitable packing 28 is provided in the recess 26 for the rotating head 27 and the head is fashioned with a flexible pipe or tube 30, and this tube extends to the usual standard type of air valve 31 carried by the wheel tire. In addition to the packing 28, the head 27 is provided with a flexible washer or packing disk 32 and a spring 33 interposed between this disk and the outer wall of an open center nut 34 holds the packing 32 against the head 27. From this construction it will be apparent that the head 27, together with the air tube 30 revolves with the wheel when the automobile is in motion. The tire may be inflated from the reservoir 8 by manipulating one of the valves 16 to introduce air under pressure through pipe 13 to the conduit 21 in the journal 3, and thence by way of the spherical head 27 and tube 30 the air under pressure is conveyed to the wheel tire. The two front journals 3 are of the same construction and the arrangement for both journals is as shown in Fig. 6. The air pressure in either of the tires may be ascertained by consulting one of the gauges 17, and the pressure in the tires may be controlled by manipulating either of the two valves 16 for the front wheels.

The two rear wheels are also supplied with air from the reservoir, and each of the rear wheels is provided with a construction as indicated in Fig. 5. In this view it will be seen that a nipple 35 is used for the attachment of the short pipe section 36 which extends to the tire valve 29. This nipple is an integral part of a collar or clamp ring 37 having a clamp bolt 38 and which forms part of the hub portion 7. The hub is provided with the usual dust band 39 and a felt washer 40 is interposed between the band and the hub as a packing for the threaded end 41 of the journal 6 of the rear axle. The threaded end 41 is provided with a central recess 42 and an air channel 43 in the journal terminates in a channel port 44 in the journal 6, and this channel port communicates with pipe 15. A stationary head 45 of spherical shape is located in the recess 42 and a packing gland 46 is provided in the recess for the head.

The hub nut 47 which is threaded on the end 41 of the axle 6 has an open center and a pipe 48 extends from the head 45 to a socket plug 49 in the clamp ring 37, and communicates with the nipple 35, and through this nipple with the pipe section 36 and tire valves 29 of the rear wheels. On the outer side of the stationary spherical head 45, I provide a packing washer 50, and this is retained by an open center nut 51 that is threaded in the lock nut 47. A spring 52 is coiled about a portion of the pipe 48 inside the nut 51 and interposed between the washer 50 and the open center nut 51, for the purpose of holding the head 45 in place and preventing leakage of air at this joint.

The rotating end of the journal 6, and the parts carried thereby are covered by a dust cap 53 which is screwed onto the flange 54 of the clamp ring 37.

In Figure 5, I have illustrated at the left end of the figure the detailed connection of one of the rear air pipes as 15, with the rear axle of the automobile. An air chamber 55 is provided around the shaft 6 which communicates with the port 44 and with the pipe 15. This chamber is bounded at its ends by two cone shaped rings 56 and 57 which are held apart by a spring 58, and these rings from the ends of the annular air chamber 55 that is at all times in communication with the air port 44 in the journal or shaft 6.

An air tight joint is made about this air chamber by the use of a packing sleeve 59 which is provided with end flanges and at its central portion is retained and reinforced by the use of a pair of metal bands 60 and 61. These annular bands or rings are spaced apart, one of them on the exterior of the packing sleeve and the other on the interior of the sleeve, and the bands are rigidly joined by means of rivets 62. The packing sleeve 59 and the annular bands 60, 61 are retained in rigid stationary relationship to the housing 20 within which they are enclosed, by means of one or more lock bolts 63 threaded through a wall of the housing 20 and engaging the exterior of the metal band 60.

At the ends of the packing sleeve, the flanges of the sleeve are enclosed and retained by means of flanged collars 64 and 65 that are fixed by screws 66 to the journal 6, and these collars revolve with the journal. It will be apparent that the air pressure from the reservoir 8 through pipe 15 is conveyed to the interior of the annular air chamber 55, and by means of the spring pressed cone shaped rings 56 and 57 an air tight joint is formed about the chamber, in connection with the packing sleeve 59. The air of course passes from the chamber 55 through the air port 44 and the channel 43 to the hub portion of the wheel and thence by the pipe 48 and pipe 36 to the tire.

It will be apparent from the above description taken in connection with my drawings, that the pressure of air in any one of the four tires may readily be ascertained by the driver of an automobile, by consulting the four gauges indicated as 17. These gauges will indicate the condition of the air pressure in the tire, and action may be taken in accordance with the indications of the gauges for properly maintaining the desired or required pressure in the tires.

Various changes and alterations may be made in the construction herein disclosed within the scope of my claim without departing from the spirit of my invention.

Having thus fully described my invention, what I claim as new and desire to secure by Letters Patent is—

The combination with a housing and the journal end of a wheel axle, of a packing sleeve having end flanges surrounding the axle, a pair of spaced annular retaining rings rigidly connected to the sleeve to form an annular air chamber communicating with an air passage in the axle, a pair of spaced conical shaped rings within the flanged ends of the sleeve and a spring between them, and a pair of exterior, flanged retaining rings fixed to the exterior of the axle.

RUTHERFORD H. HUTCHINSON.